July 18, 1933. R. R. GRENINGER 1,918,640
EXPANDING TOOL
Filed June 15, 1931
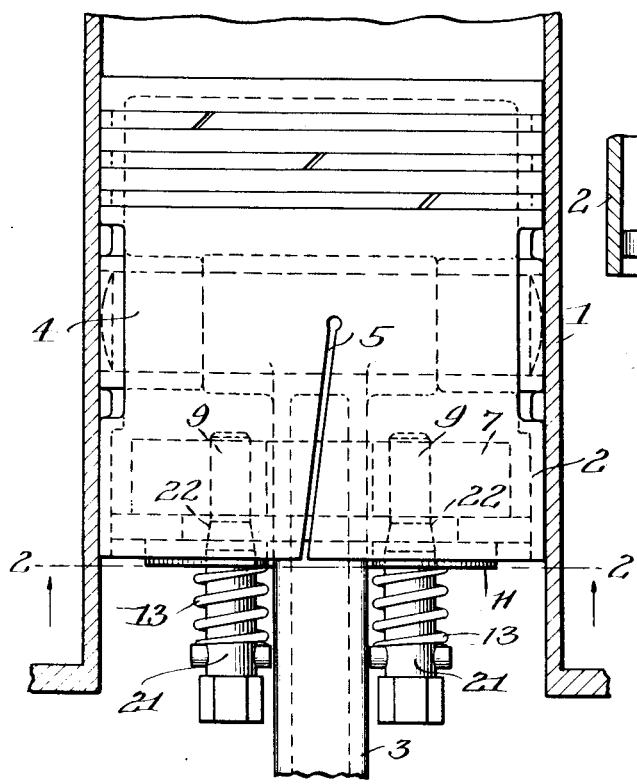
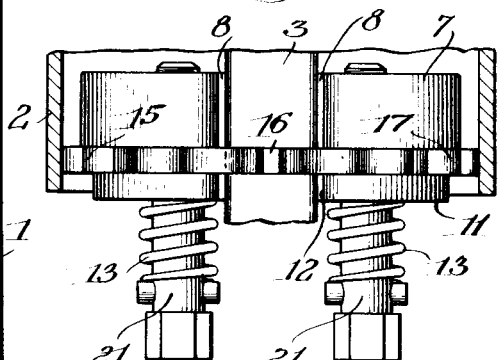
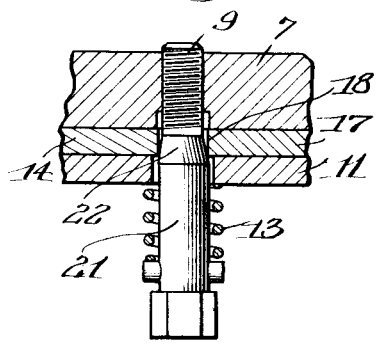
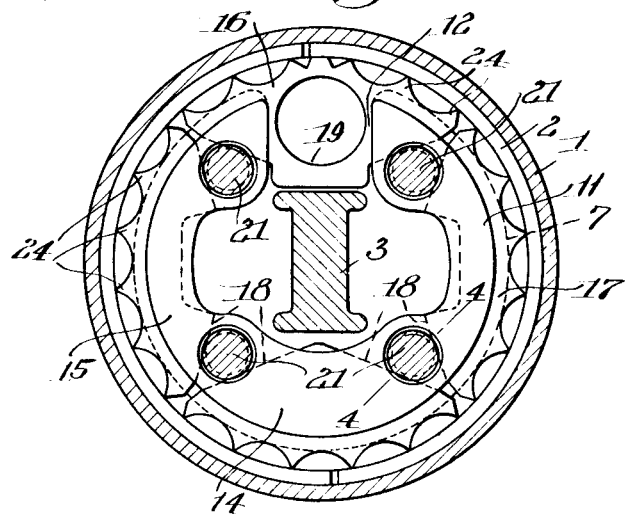
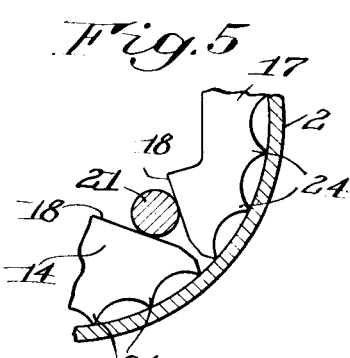
INVENTOR
Robert R. Greninger
BY Harold E. Stonebrake
his ATTORNEY Patented July 18, 1933

1,918,640

UNITED STATES PATENT OFFICE

ROBERT R. GRENINGER, OF ROCHESTER, NEW YORK

EXPANDING TOOL

Application filed June 15, 1931. Serial No. 544,435.

This invention relates to improvements in expanding tools, and especially to expanding tools of the kind employed for expanding pistons of internal combustion motors.

The principal object of the invention is the provision of a simple and inexpensive tool of this kind which can readily be inserted in a piston for expanding it without removing it from its cylinder or disconnecting it from its connecting rod.

Another object of the invention is the provision of a tool of this kind which may be manually operated to expand the walls of a piston into contact with the walls of its cylinder.

Still another object of the invention is the provision of a tool of this kind having a plurality of expanding dogs movably mounted in a ring and manually operated cams for expanding the dogs into engagement with the piston to expand its walls.

To these and other ends, the invention consists in the construction and arrangement of parts that will appear from the following description when read in conjunction with the accompanying drawing, the novel features being pointed out in the claims at the end of the specification.

In the drawing:

Fig. 1 is a side elevation of a piston showing an expanding tool constructed according to one embodiment of the invention arranged therein, the walls of the cylinder being shown in section;

Fig. 2 is a sectional view taken substantially on line 2—2 of Fig. 1 and looking in the direction of the arrows at said line;

Fig. 3 is a fragmentary view of the piston showing the tool arranged therein;

Fig. 4 is a detail sectional view of one of the cam members, the section being taken substantially on line 4—4 of Fig. 2; and Fig. 5 is a fragmentary detail view illustrating the arrangement of the dogs to the cam members and the inner wall of the piston.

Referring particularly to the drawing, in which like reference numerals refer to the same part in all views, 1 is the cylinder of an internal combustion engine in which is slidably arranged a hollow piston 2 of usual construction. The piston is operatively connected with a crank shaft, not shown, by means of a connecting rod 3 pivotally connected with the piston by means of a wrist pin 4. As indicated in Fig. 1 if the drawing, the piston fits closely within the cylinder. The skirt of the cylinder is split or provided with diametrically opposite slots 5 which permit of a limited expansion and contraction of the piston within the cylinder.

For perfect operation, the outer wall of the piston should always fit closely against the inner wall of the cylinder. With use, however, the walls of the piston have a tendency to contract more or less and also become worn on their outer surfaces so that the interengagement of the outer surface of the piston with the inner wall of the cylinder becomes imperfect, with a consequent loss of power. In the past, it has been the practice to remove the contracted piston from the cylinder and the connecting rod from the piston to expand its walls. This operation was not only expensive, but owing to the difficulty of properly gaging the required amount of expansion, was inaccurate. If the expansion was insufficient, there was a consequent loss of power, and if the expansion was too great it was necessary to again contract the piston before it could be reinserted in its cylinder. The present invention provides an expanding tool which can be inserted in the piston while the latter is in the cylinder and without disconnecting it from its connecting rod or the connecting rod from the crank.

Said tool comprises a frame in the form of a ring 7 open at 8 and provided with a plurality of tapped openings adapted to be engaged by the threaded ends of cam members in the form of studs 9. Four of the cam members are shown in the present embodiment, although it will be understood that a greater or lesser number may be employed without departing from the spirit of the invention. The frame or ring 7 is of smaller diameter than the internal diameter of the piston, and the opening 8 is sufficiently large to readily pass over the connecting rod 3.

Cooperating with the ring 7 is a retaining ring or clamp 11 of the same general size and form as the ring 7 and also having an opening 12 registering with the opening 8, whereby it may pass over the connecting rod, and having enlarged openings adapted to register with the tapped openings in the ring 7 through which the cam members 9 project. Springs 13 coiled about the outer ends of the studs 9 are anchored on their outer ends to the studs, and at their inner ends engage the retaining ring 11 and resiliently press it toward the ring 7. Arranged on the ring 7 and resiliently engaged by the ring 11 are a plurality of expanding members or dogs 14, 15, 16 and 17, one of said dogs being arranged between each adjacent pair of the cam members and engaged thereby. The adjacent ends of the dogs are inclined inwardly away from each other as at 18, so that they may be moved outwardly or projected from between the rings 7 and 11 by the action of the cams 22.

By referring to Fig. 2, it will be noted that the dog 16 is arranged across or spans the openings in the rings 7 and 11 and is provided with an opening 19 whereby it may be engaged to pull it from between the rings 7 and 11 while they are arranged over the connecting rod 3, after which the dog may be again arranged in position between them. The outer ends 21 of the studs 9 are of greater diameter than the threaded ends, and the studs are tapered between such larger and smaller portions to provide camming portions or cams 22 between them. The cams 22 are so arranged that they engage the ends 18 of adjacent dogs, so that by turning the cam members in one direction to screw them into the ring 7, the cams 22 engage the dogs and cam them outwardly from between the rings 7 and 11 into engagement with the inner wall of the piston and expand it into contact with the inner wall of the cylinder. The outer ends of the cam members or studs 9 may be made of polygonal form to be readily engaged by a suitable tool, such as a wrench. The arrangement of the dogs is such that they provide a substantially continuous outer periphery whereby they engage the inner wall of the piston, which engaging portion may be provided with spaced engaging points 24, which provide for a positive and uniform interengagement between the dogs and the inner wall of the piston.

In operation, the cam members are adjusted to a position to permit the dogs to be sufficiently retracted to be inserted in the piston. The dog 16 is then removed to permit the tool to be arranged over the connecting rod and then reinserted between the rings 7 and 11. The tool is then inserted in that portion of the skirt of the piston which it is desired to expand and the cam members gradually turned into the ring 7. This brings the cams 22 into engagement with the cam ends 18 of the dogs and cams them radially outwardly from between the rings 7 and 11 and into engagement with the wall of the piston 2, which may be expanded thereby into contact with the inner wall of the cylinder. The cam members are then turned in a reverse direction to raise the cams 22 from the dogs, which permits them to yield or slide inwardly against the resiliency of the springs 13 so that the tool can be removed from the piston. It will be noted that the pressure of the ring 11 on the dogs is gradually increased as the dogs are cammed outwardly, due to the retraction of the springs 13 as the cam members are screwed into the ring 7.

Although only one embodiment of the invention is shown and described herein, it will be understood that this application is intended to cover such changes or modifications as come within the spirit of the invention or scope of the following claims.

I claim:

1. A piston expanding tool comprising a ring adapted to be inserted axially into a piston, a plurality of dogs on said ring, a second ring cooperating with said first mentioned ring for frictionally retaining the dogs thereon, spring controlled means pressing the second ring against the dogs and holding the latter resiliently between the rings, and means for moving said dogs radially of said ring into engagement with the walls of the piston.

2. A piston expanding tool comprising a ring adapted to be axially inserted into a piston, a plurality of dogs on said ring, a second ring cooperating with said first mentioned ring for retaining the dogs thereon, means for resiliently pressing the second ring into engagement with the dogs, and means for moving the dogs radially of said rings into engagement with the walls of the piston.

3. A piston expanding tool comprising a ring adapted to be inserted axially into a piston, a plurality of dogs on said ring, means cooperating with said ring for resiliently retaining the dogs thereon, and cam members engaging said dogs and movable relatively thereto to cam the dogs radially of the ring into engagement with the walls of the piston.

4. A piston expanding tool comprising a ring adapted to be inserted axially into a piston and having an opening to provide a clearance for a connecting rod on the piston, a plurality of dogs on said ring, and means for moving the dogs radially of the ring into engagement with the piston.

5. A piston expanding tool comprising a ring adapted to be inserted axially into a piston and having an opening to provide a clearance for a connecting rod on the piston, a plurality of dogs on said ring, one of said dogs being detachable and arranged to span said opening, and cams for moving said dogs radially of the ring into engagement with the piston.

6. A piston expanding tool comprising a ring adapted to be inserted axially into a piston and having an opening to provide a clearance for a connecting rod on the piston, a plurality of dogs on said ring one of which is arranged to span said opening, studs arranged between the ends of said dogs and threaded into said ring, a retaining ring on said studs, and means on said studs for moving the dogs radially of said rings into engagement with the piston.

7. A piston expanding tool comprising a ring adapted to be inserted axially into a piston and having an opening to provide a clearance for a connecting rod on the piston, a plurality of dogs on said ring one of which is arranged to span said opening, studs arranged between the ends of said dogs and threaded into said ring, a retaining ring on said studs, means on said studs for pressing the retaining ring into engagement with the dogs, and cams on the studs engaging said dogs for moving the dogs radially into engagement with the piston.

8. An expanding tool comprising a ring, a plurality of studs spaced from each other and threaded into said ring, a plurality of dogs on said ring arranged between said studs, means on the studs for retaining the dogs on said ring, and means for moving the dogs radially of said ring.

9. An expanding tool comprising a ring, a plurality of studs spaced from each other and threaded into said ring, a plurality of dogs on said ring arranged between said studs, a second ring movably mounted on said studs for retaining the dogs on said first ring, means for pressing said second ring into engagement with said dogs, and means on said studs for moving the dogs radially of said ring.

10. An expanding tool comprising a ring having an opening, a plurality of studs spaced from each other and threaded into said ring, a plurality of dogs on said ring arranged between said studs and spanning said opening, a second ring on said studs having an opening arranged to register with the opening in the first-mentioned ring, means for pressing said second ring into resilient engagement with said dogs, and means on said studs for moving the dogs radially of said rings.

11. An expanding tool comprising a ring having an opening, a plurality of studs spaced from each other and threaded into said ring, a plurality of dogs on said ring arranged between said studs and spanning said opening, a second ring on said studs having an opening arranged to register with the opening in the first-mentioned ring, resilient means for pressing the second ring into engagement with said dogs, means on said studs for increasing the pressure of said resilient means on the second ring, and other means on said studs for moving the dogs radially of said rings.

ROBERT R. GRENINGER.